(12) United States Patent
Ernst et al.

(10) Patent No.: US 9,011,723 B2
(45) Date of Patent: Apr. 21, 2015

(54) METHOD FOR TREATING ALTERNATIVE, CARBON-CONTAINING, LOW-CALORIC WASTE MATERIALS FOR USE IN FURNACE SYSTEMS

(75) Inventors: Frank Ernst, Zürich (CH); Albert Obrist, Möriken (CH)

(73) Assignee: Holcim Technology Ltd., Rapperswil-Jona (CH)

( * ) Notice: Subject to any disclaimer, the term of this patent is extended or adjusted under 35 U.S.C. 154(b) by 1108 days.

(21) Appl. No.: 12/737,720

(22) PCT Filed: Aug. 10, 2009

(86) PCT No.: PCT/IB2009/006490
§ 371 (c)(1),
(2), (4) Date: Feb. 9, 2011

(87) PCT Pub. No.: WO2010/018436
PCT Pub. Date: Feb. 18, 2010

(65) Prior Publication Data
US 2011/0127470 A1  Jun. 2, 2011

(30) Foreign Application Priority Data

Aug. 14, 2008 (AT) ................................. 1274/2008

(51) Int. Cl.
*C01B 3/02* (2006.01)
*C04B 7/44* (2006.01)
*F23G 5/027* (2006.01)
*F27D 17/00* (2006.01)
*C10J 3/10* (2006.01)
*F23G 5/20* (2006.01)

(52) U.S. Cl.
CPC ............ *F27D 17/004* (2013.01); *C04B 7/4407* (2013.01); *C04B 7/4423* (2013.01); *C04B 7/4446* (2013.01); *C10J 3/10* (2013.01); *C10J 2300/0969* (2013.01); *C10J 2300/0973* (2013.01); *C10J 2300/1246* (2013.01); *F23G 5/0276* (2013.01); *F23G 5/20* (2013.01); *F23G 2201/302* (2013.01); *F23G 2201/303* (2013.01); *F23G 2900/50204* (2013.01)

(58) Field of Classification Search
CPC .. C04B 7/4407; C04B 7/4423; C04B 7/4446; C10J 3/10; C10J 3/12; C10J 3/46; C10J 3/54; C10J 2300/0969; C10J 2300/0973; C10J 2300/0976; C10J 2300/1246; F23G 5/0276; F23G 5/20; F23G 2201/40; F23G 2201/302; F23G 2201/303; F23G 2900/50204; F27D 17/004
USPC ............... 252/373; 423/246, 248, 655, 648.1; 106/739; 48/209, 210
See application file for complete search history.

(56) References Cited

U.S. PATENT DOCUMENTS

| | | | |
|---|---|---|---|
| 4,391,612 A * | 7/1983 | Chang | 48/202 |
| 6,805,554 B2 * | 10/2004 | Ludger et al. | 432/13 |
| 2006/0112639 A1 | 6/2006 | Nick et al. | |

FOREIGN PATENT DOCUMENTS

| | | | |
|---|---|---|---|
| CN | 1274830 | 11/2000 | |
| CN | 101191060 A | 6/2008 | |
| DE | 32 20 229 A1 | 12/1982 | |
| DE | 33 20 670 A1 | 12/1984 | |
| JP | 63139986 * | 6/1988 | ................ C10J 3/00 |
| JP | 1-121617 A | 5/1989 | |
| RU | 2 209 790 | 8/2003 | |
| WO | 00/56678 A1 | 9/2000 | |
| WO | WO 02/090283 A1 | 11/2002 | |

* cited by examiner

*Primary Examiner* — Stanley Silverman
*Assistant Examiner* — Kallambella Vijayakumar
(74) *Attorney, Agent, or Firm* — Taft Stettinius & Hollister LLP

(57) ABSTRACT

In a method for treating alternative, carbon-containing, low-caloric waste materials for use in furnace systems, in particular rotary tubular kilns for the production of clinker, the carbon-containing, alternative fuels are subjected to high-temperature gasification under anoxic conditions at temperatures above 1000° C., wherein water, water vapor or $CO_2$ is injected to ensure a reaction forming CO and $H_2$. The waste heat from a clinker cooler is used for the high-temperature gasification.

20 Claims, No Drawings

METHOD FOR TREATING ALTERNATIVE, CARBON-CONTAINING, LOW-CALORIC WASTE MATERIALS FOR USE IN FURNACE SYSTEMS

The invention relates to a method for treating alternative, carbon-containing, low-caloric waste materials for use in furnace systems, in particular rotary tubular kilns for the production of clinker, wherein the carbon-containing alternative fuels are subjected to high-temperature gasification under anoxic conditions at temperatures above 1000° C., and wherein water, water vapor or $CO_2$ is injected to ensure a reaction forming CO and $H_2$.

Methods for treating industrial wastes in order to produce synthesis gases have already been proposed in various configurations. High-temperature gasification methods in which autothermal heating under controlled conditions is realized are characterized in that high demands are placed on the caloric value of the alternative fuels to avoid burning to largely inert gases. The method according to the invention is essentially characterized in that the waste heat from a clinker cooler is used for the high-temperature gasification. By anoxic conditions, conditions at which no free oxygen is added are understood. Anoxic conditions are thus characterized in that hot air or oxygen does not enter the reactor in which the gasification is performed. By contrast, oxygen compounds such as, e.g., water vapor or $CO_2$ may, of course, be definitely reacted in such an allothermal gasification process, the equilibrium in terms of quantity, at the high temperature sought by the invention, being on the side of carbon monoxide in the case of $CO_2$ in the presence of carbon, and, when injecting water, on the side of the synthesis gas, i.e. carbon monoxide and hydrogen. The method according to the invention is especially suitable for treating alternative, carbon-containing fuels for use in the production of clinker, since in that case it is possible to provide the high temperature level sought by the invention via the imported hot clinker. At extremely high temperatures, i.e. temperatures between 1000 and 1300° C., the cooling air used in the clinker cooler will reach appropriate heat exchangers, e.g. in the form of tertiary air, in which heat exchangers appropriate heating under anoxic conditions will be achieved while avoiding a direct exchange of the gases. The method is thus advantageously performed in that the hot exhaust air from a clinker cooler is used, with heating being effected through heat exchangers. In addition to heat exchanger configurations, for instance, in the form of double-walled rotary tubes, such heating may preferably be effected in that the hot exhaust air is used for heating temperature-proof heat-storage means such as sand or ceramics, and that the carbon-containing alternative fuels to be treated are mixed with the heated heat storage means.

In doing so, it can be proceeded in a particularly simple manner in that a portion of the clinker entering the clinker cooler is used as said temperature-proof heat storage means. In this manner, a direct reaction with the oxygen of the air is avoided and an accordingly hot gas having a high caloric value is immediately obtained without heating the nitrogen ballast entrained by the cooling air, said hot gas being subsequently also usable for precalcining the batches. In modern cement production methods, 60% of the thermal energy is mostly used in the precalciner, whereas about 40% is used for the main furnace in the rotary tubular kiln. Due to the high-quality synthesis gas, the portion used in this manner in the rotary tubular kiln can be substantially increased and, in particular, substantially increased relative to the direct use of alternative fuels in the rotary tubular kiln. The use of the synthesis gas is above all of interest in the main furnace, since there alternative fuels can only be used upon elaborate pretreatments or in small amounts. Into the precalciner, also coarser alternative fuels may, by contrast, be charged.

The advantage of the present invention thus is to be seen in the thermal pretreatment of wastes and, hence, in the production of a gas which allows for uniform firing of the main furnace without elaborately modifying the burners. By the high-temperature gasification according to the invention, it is also feasible to substantially simplify and reduce the hitherto required mechanical processing of alternative fuels, wherein the method is particularly suitable for non-uniform alternative fuels. What is essential is its integration in the clinker production process, since in this case the tertiary air provides the accordingly high temperatures necessary for the high-quality synthesis gas. If a portion of the clinker entering the clinker cooler is directly used as a temperature-proof heat-storage means for allothermal heating, which is preferably done according to the invention, the formed ash and the solids left from the alternative fuels will pass into the clinker in a relatively good mechanical dispersion and can thus subsequently be directly used as mineral components in a cement mill. The oxygen reacted in the context of the method according to the invention in order to produce the synthesis gas, is exclusively obtained from oxygen compounds like $H_2O$ or $CO_2$ such that the desired thermodynamic equilibrium will be reliably maintained at temperatures above 1000° C. and, in particular, temperatures above 1100° C. Pyrolysis methods which are likewise performed at under-stoichiometric or anaerobic conditions are usually carried out at substantially lower temperatures and will in no event result in the high-quality synthesis gases as are obtained by the mode of procedure according to the invention. It is, above all, not possible to-adapt the obtained gas quality to the respective requirements to the same extent at accordingly lower temperatures in order to achieve a uniform quality.

The mode of procedure according to the invention allows for the utilization of the high temperature level of the tertiary air, or the produced clinker, to a far larger extent than would be possible in other methods for utilizing waste heat. When utilizing waste heat for the generation of vapor, and the subsequent production of energy via vapor turbines, the reaction takes places at substantially lower temperatures such that the potential of the high temperatures of the tertiary air and the produced clinker, respectively, will not be utilized completely.

Besides the synthesis gas, ash is also a product to be used in the production of cement, namely by being ground to the clinker in a cement mill as a hydraulically active component. The advantages of an indirect gasification in this respect reside in the separation of the ash, and its selective and controlled admixtue by grinding, while, with the clinker being utilized as a heat-transferring means, the ash is already directly dispersed in the clinker as pointed out above.

In order to ensure the high temperatures necessary for gasification, it may be suitable in the present case to use, and burn, a portion of the produced synthesis gas for heating the gasification reactor. When using the clinker as a heat exchanger, the ash formed during gasification will immediately pass into the product as a mineral component, and thus can also be optimally utilized. The utilization of the ash as a mineral component in cement will, however, also be useful, if the gasification is performed in a separate gasification reactor, from which the ash and the synthesis gas will then be discharged separately.

The invention claimed is:
1. A method for treating low-caloric waste materials containing carbon for use in a furnace system, comprising:

subjecting the low-caloric waste materials containing carbon to high-temperature gasification under anoxic conditions at temperatures above 1000° C.; and injecting water, water vapor or $CO_2$ to ensure a reaction forming CO and $H_2$, wherein waste heat from a clinker cooler is used for the high-temperature gasification, and hot exhaust air from the clinker cooler is used for heating, with heating being effected through heat exchangers.

2. A method according to claim 1, wherein the hot exhaust air is used for heating temperature-proof heat-storage means, and the low-caloric waste materials containing carbon to be treated are mixed with the heated heat-storage means.

3. A method according to claim 2, wherein a portion of clinker entering the clinker cooler is used as said temperature-proof heat storage means.

4. A method according to claim 1, wherein heating of the low-caloric waste materials is performed in a rotary tubular kiln.

5. A method according to claim 1, wherein a portion of generated synthesis gas is burned for attaining gasification temperature.

6. A method according to claim 1, wherein ash from the gasification is mixed into cement as a mineral component.

7. A method according to claim 1, wherein the low-caloric waste materials are alternative fuels.

8. A method according to claim 2, wherein the temperature-proof heat-storage means are sand or ceramics.

9. A method according to claim 2, wherein heating of the low-caloric waste materials is performed in a rotary tubular kiln.

10. A method according to claim 3, wherein heating of the low-caloric waste materials is performed in a rotary tubular kiln.

11. A method according to claim 2, wherein a portion of generated synthesis gas is burned for attaining gasification temperature.

12. A method according to claim 3, wherein a portion of generated synthesis gas is burned for attaining gasification temperature.

13. A method according to claim 4, wherein a portion of generated synthesis gas is burned for attaining gasification temperature.

14. A method according to claim 2, wherein ash from the gasification is mixed into cement as a mineral component.

15. A method according to claim 3, wherein ash from the gasification is mixed into cement as a mineral component.

16. A method according to claim 4, wherein ash from the gasification is mixed into cement as a mineral component.

17. A method according to claim 5, wherein ash from the gasification is mixed into cement as a mineral component.

18. A method according to claim 1, wherein the furnace system is a rotary tubular kiln for production of clinker.

19. A method according to claim 4, wherein the furnace system is a rotary tubular kiln for production of clinker.

20. A method for treating low-caloric waste materials containing carbon for use in a furnace system, comprising:

subjecting the low-caloric waste materials containing carbon to high-temperature gasification under anoxic conditions at temperatures above 1000° C.; and injecting water, water vapor or $CO_2$ to ensure a reaction forming CO and $H_2$, wherein waste heat from a clinker cooler is used for the high-temperature gasification, hot exhaust air from the clinker cooler is used for heating, with heating being effected through heat exchangers, the hot exhaust air is used for heating temperature-proof heat-storage means, the temperature-proof heat-storage means are sand or ceramics, the low-caloric waste materials to be treated are mixed with the heated heat-storage means, a portion of clinker entering the clinker cooler is used as the temperature-proof heat-storage means, heating of the low-caloric waste materials is performed in a rotary tubular kiln for the production of clinker, a portion of generated synthesis gas is burned for attaining gasification temperature, and ash from the gasification method is mixed into cement as a mineral component.

* * * * *